(12) United States Patent
Tahara et al.

(10) Patent No.: US 10,263,495 B2
(45) Date of Patent: Apr. 16, 2019

(54) ROTARY ELECTRIC MACHINE

(71) Applicant: Mitsubishi Electric Corporation, Tokyo (JP)

(72) Inventors: Jun Tahara, Tokyo (JP); Masaki Kato, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 273 days.

(21) Appl. No.: 15/260,868

(22) Filed: Sep. 9, 2016

(65) Prior Publication Data

US 2017/0264167 A1    Sep. 14, 2017

(30) Foreign Application Priority Data

Mar. 11, 2016   (JP) ................................ 2016-047934

(51) Int. Cl.
| | | |
|---|---|---|
| *H02K 5/18* | (2006.01) | |
| *H02K 9/00* | (2006.01) | |
| *H02K 11/00* | (2016.01) | |
| *H02K 11/33* | (2016.01) | |

(52) U.S. Cl.
CPC .............. *H02K 9/005* (2013.01); *H02K 5/18* (2013.01); *H02K 11/0094* (2013.01); *H02K 11/33* (2016.01)

(58) Field of Classification Search
CPC .... H02K 11/33; H02K 11/0094; H02K 9/005; H02K 5/18
USPC ....................................................... 310/68 D
See application file for complete search history.

(56) References Cited

U.S. PATENT DOCUMENTS

| | | | | |
|---|---|---|---|---|
| 7,683,511 | B2 * | 3/2010 | Iwashima | ............... H02K 11/33 |
| | | | | 310/68 R |
| 8,957,557 | B2 * | 2/2015 | Yamasaki | ............ B62D 5/0406 |
| | | | | 310/68 D |
| 9,025,336 | B2 * | 5/2015 | Minato | ................. H01L 21/561 |
| | | | | 361/730 |
| 9,088,195 | B2 * | 7/2015 | Yamasaki | ............ B62D 5/0406 |
| 2017/0305456 | A1 * | 10/2017 | Iwabuki | ................... B62D 5/04 |

FOREIGN PATENT DOCUMENTS

| | | |
|---|---|---|
| JP | 2003-324903 A | 11/2003 |
| JP | 2014-236660 A | 12/2014 |
| JP | 2016-7108 A | 1/2016 |

(Continued)

OTHER PUBLICATIONS

English translation of JP 2014-236660 A, accessed Aug. 6, 2018 <https://www4.j-platpat.inpit.go.jp/cgi-bin/tran_web_cgi_ejje?u= http://www4.j-platpat.inpit.go.jp/eng/translation/201808070153048 864358621287152960145F7B56A9A537284671EB9FBDCA B4F8>.*

(Continued)

*Primary Examiner* — Jeremy A Luks
(74) *Attorney, Agent, or Firm* — Sughrue Mion, PLLC; Richard C. Turner

(57) ABSTRACT

In a rotary electric machine, a power supply unit includes a metal casing, a power circuit unit mounted in the metal casing, and a control board for controlling an operation of the power circuit unit, and supplies power to a motor main body. The power circuit unit includes a plurality of power semiconductor components and a capacitor unit. The plurality of power semiconductor components and the capacitor unit are disposed alternately on a plane perpendicular to a rotary shaft of the motor main body.

4 Claims, 5 Drawing Sheets

(56) References Cited

FOREIGN PATENT DOCUMENTS

WO      2012/056735 A1    5/2012
WO      2014/188803 A1    11/2014

OTHER PUBLICATIONS

Communication dated Aug. 15, 2017, from Japanese Patent Office in counterpart application No. 2016-047934.
Communication dated Jan. 10, 2017 from the Japanese Patent Office in counterpart Application No. 2016-047934.

\* cited by examiner

ROTARY ELECTRIC MACHINE

BACKGROUND OF THE INVENTION

1. Field of the Invention

This invention relates to a rotary electric machine which is mounted in an automobile or the like, for example, and in which a motor and a power supply unit including a power circuit are formed integrally.

2. Description of the Related Art

A conventional power conversion device includes a power circuit, a capacitor, a field circuit, and a control circuit, these components being housed in a space constituted by a heatsink, a case, and so on. The power circuit converts direct current power into alternating current power or alternating current power into direct current power. The capacitor absorbs a ripple current generated when a semiconductor element constituting the power circuit is activated. The field circuit supplies a field current to a rotor winding of a rotary electric machine. The control circuit controls the power circuit and the field circuit (see WO 2014/188803, for example).

SUMMARY OF THE INVENTION

Although not clarified in WO 2014/188803, when a capacitor is disposed in a single uncorrelated location with respect to a plurality of power semiconductor components, a wiring distance to a power semiconductor component located far from the capacitor increases, leading to an increase in inductance, and as a result, voltage variation increases. When the voltage variation increases, the performance of the device may deteriorate, and it is therefore necessary to increase the capacitance of the capacitor in order to suppress the voltage variation, leading to an increase in the size of the device.

Further, when the distances between the capacitor and the respective power semiconductor components differ from each other, the respective inductance values differ, and as a result, variation may occur in the ripple, leading to performance deterioration. It is therefore necessary to align the distances from the capacitor to the respective power semiconductor components, but in so doing, the wiring distance from the capacitor to a nearby power semiconductor component increases, leading to an increase in inductance and a resulting increase in voltage variation.

This invention has been designed to solve the problems described above, and an object thereof is to obtain a rotary electric machine in which the size of a power supply unit can be reduced while suppressing voltage variation.

A rotary electric machine according to this invention includes a motor main body having a rotary shaft, and a power supply unit that includes a metal casing, a power circuit unit mounted in the metal casing, and a control board for controlling an operation of the power circuit unit, and that supplies power to the motor main body, wherein the power circuit unit includes a plurality of power semiconductor components and a capacitor unit, and the plurality of power semiconductor components and the capacitor unit are disposed alternately on a plane perpendicular to the rotary shaft.

In the rotary electric machine according to this invention, the plurality of power semiconductor components and the capacitor unit are disposed alternately on a plane perpendicular to the rotary shaft, and therefore the power supply unit can be reduced in size while suppressing voltage variation.

DESCRIPTION OF THE PREFERRED EMBODIMENTS

An embodiment of this invention will be described below with reference to the drawings.

First Embodiment

Figure 1:
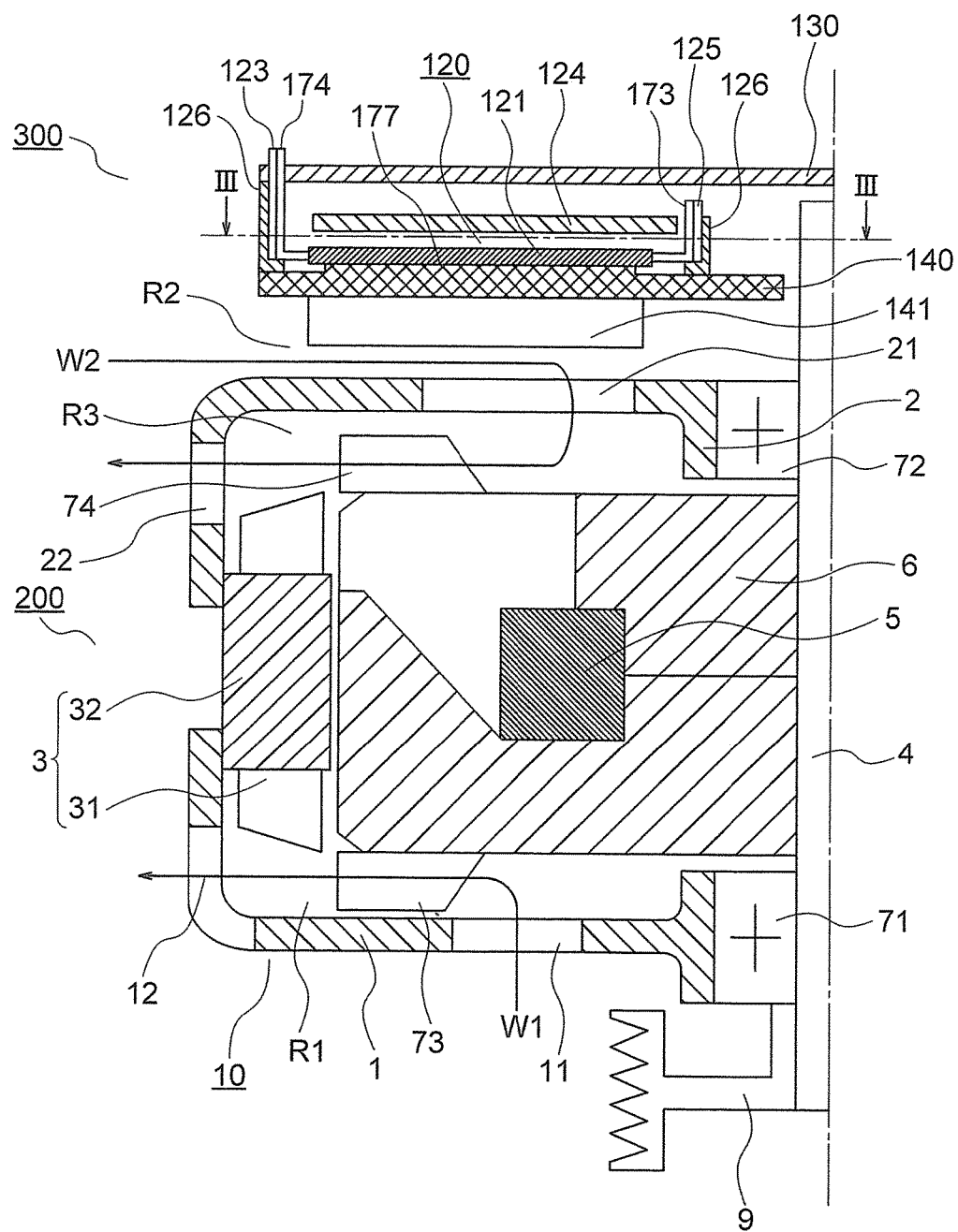
FIG. 1 is a sectional view showing main parts of a rotary electric machine according to a first embodiment of this invention.
Figure 2:
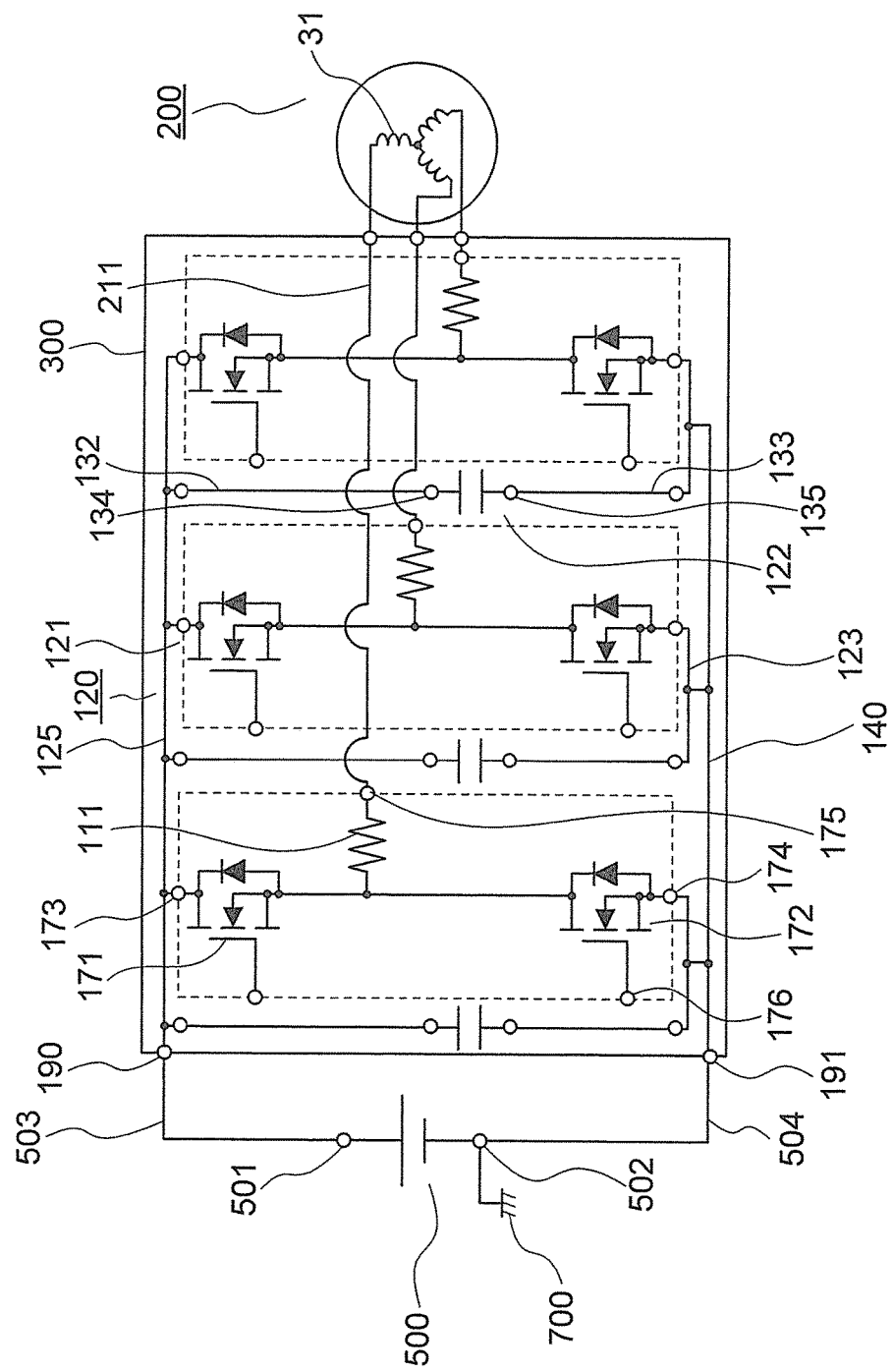
FIG. 2 is a diagram showing electric connections of the rotary electric machine shown in FIG. 1.
Figure 3:
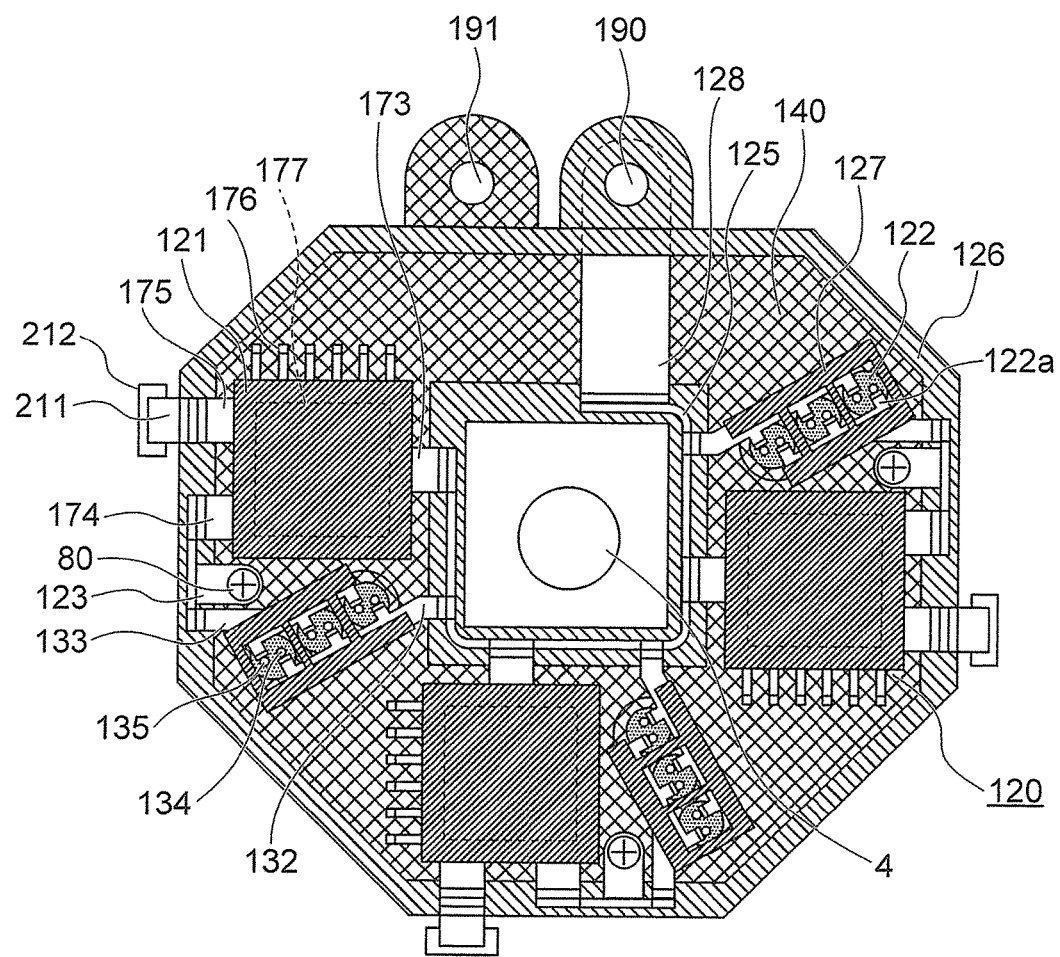
FIG. 3 is a sectional view taken along a III-III line in FIG. 1.
Figure 4:
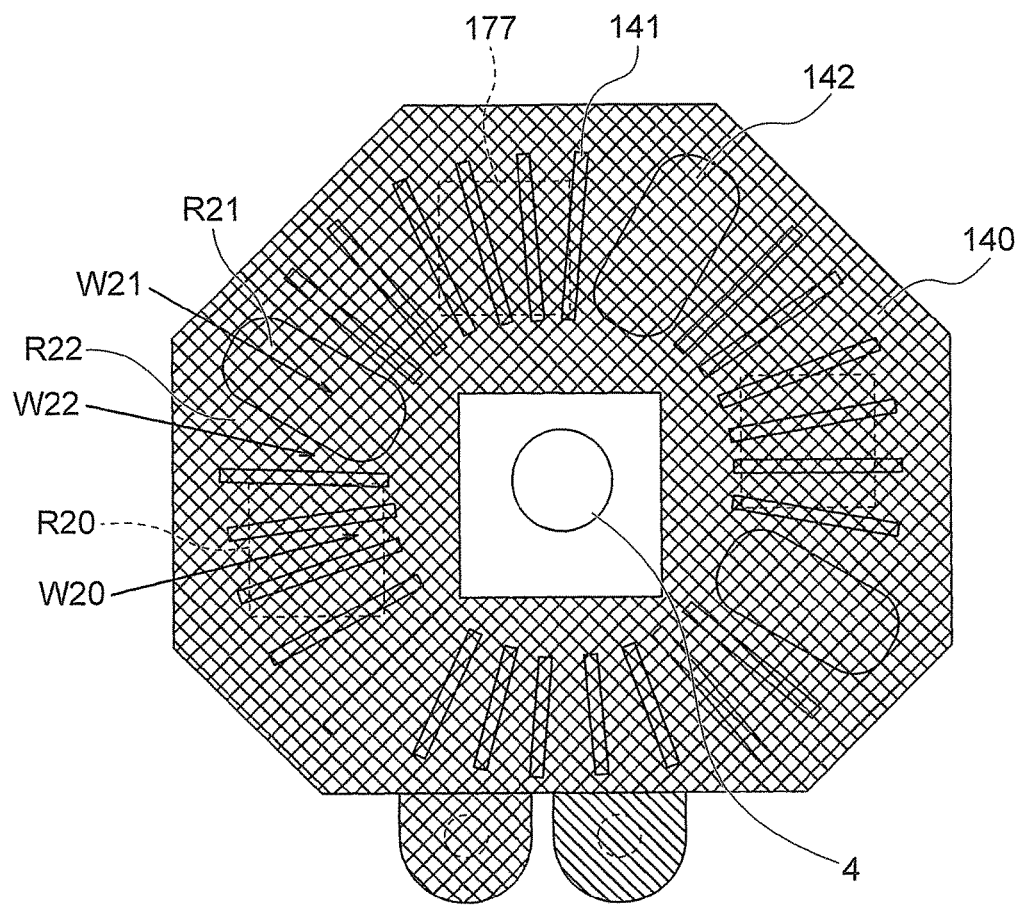
FIG. 4 is a sectional view showing a flow of cooling air through the rotary electric machine of FIG. 1.
Figure 5:
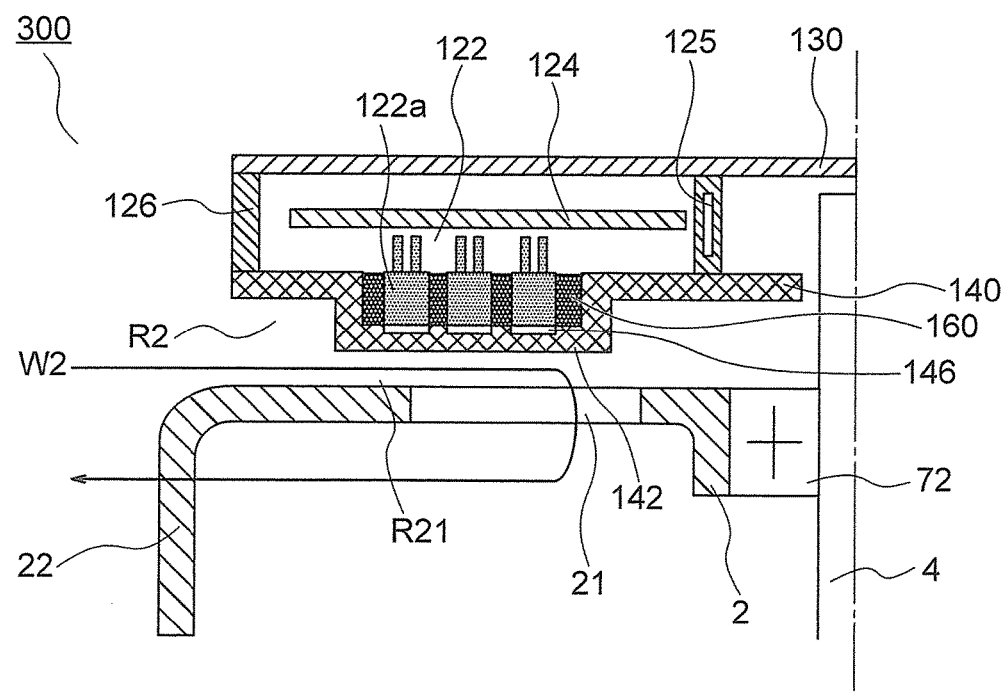
FIG. 5 is a sectional view showing a part including a smoothing capacitor unit of the rotary electric machine shown in FIG. 3.

FIG. 1 is a sectional view showing main parts of a rotary electric machine according to a first embodiment of this invention, FIG. 2 is a diagram showing electric connections of the rotary electric machine shown in FIG. 1, FIG. 3 is a sectional view taken along a III-III line in FIG. 1, FIG. 4 is a sectional view showing a flow of cooling air through the rotary electric machine of FIG. 1, and FIG. 5 is a sectional view showing apart including a smoothing capacitor unit of the rotary electric machine shown in FIG. 3.

In the drawings, the rotary electric machine includes a motor main body 200, and a power supply unit 300 that is formed integrally with the motor main body 200 so as to extend in an axial direction of the motor main body 200, and supplies power to the motor main body 200.

The motor main body 200 includes a housing 10, a stator 3, a rotary shaft 4, and a rotor 6. The housing 10 includes a bowl-shaped front bracket 1 serving as a load side bracket, and a bowl-shaped rear bracket 2 serving as an anti-load side bracket. The front bracket 1 and the rear bracket 2 are respectively formed from a metallic material such as iron.

The stator 3 includes a stator core 32 and a stator winding 31. Further, the stator 3 is sandwiched between the front bracket 1 and the rear bracket 2 from respective axial direction sides so as to be held thereby. Furthermore, the stator 3 is disposed on a radial direction outer side of the rotor 6 so as to surround the rotor 6.

The rotary shaft 4 is supported rotatably by a front side bearing 71 provided on the front bracket 1 and a rear side bearing 72 provided on the rear bracket 2. The rotor 6 includes a field winding 5, and is disposed in the housing 10. Further, the rotor 6 is fixed to the rotary shaft 4 so as to be capable of rotating about the rotary shaft 4 integrally with the rotary shaft 4.

A pulley 9 is attached to a front side end portion of the rotary shaft 4, the front side end portion of the rotary shaft 4 projecting outward in the axial direction from the front bracket 1. The motor main body 200 is coupled to a crankshaft (not shown) of an engine via the pulley 9 and a belt (not shown).

A front side cooling fan 73 is fixed to a front side end face of the rotor 6. A rear side cooling fan 74 is fixed to a rear side end face of the rotor 6. The front side cooling fan 73 and the rear side cooling fan 74 rotate integrally with the rotor 6.

A front side intake port 11 for taking in cooling air is provided in an end face of the front bracket 1. A front side discharge port 12 for discharging the cooling air is provided in an outer peripheral side face of the front bracket 1. A rear side intake port 21 for taking in the cooling air is provided in an end face of the rear bracket 2. A rear side discharge port 22 for discharging the cooling air is provided in an outer peripheral side face of the rear bracket 2.

An air duct R1 that connects the front side intake port 11 to the front side discharge port 12 is formed between an axial direction inside end face of the front bracket 1 and the rotor 6. An air duct R2 that connects the rear side intake port 21 to the outside is formed between an axial direction outside end face of the rear bracket 2 and a heat sink 140 serving as a metal casing. An air duct R3 that connects the rear side intake port 21 to the rear side discharge port 22 is formed between an axial direction inside end face of the rear bracket 2 and the rotor 6.

The power supply unit 300 includes the heat sink 140, a power circuit unit 120 mounted in the heat sink 140, a control board 124 that controls an operation of the power circuit unit 120, a resin case 126, a brush (not shown), a rotation sensor (not shown), and so on. The power circuit unit 120 includes a plurality of power semiconductor components 121, and a plurality of smoothing capacitor units 122 serving as a capacitor unit.

Each power semiconductor component 121 corresponds to a single phase. The motor main body 200 according to the first embodiment has three phases, and therefore the power supply unit 300 includes three power semiconductor components 121. Further, the power semiconductor components 121 are connected to each other in parallel.

Each power semiconductor component 121 includes an upper arm 171 and a lower arm 172. In each upper arm 171 and each lower arm 172, a MOSFET, for example, is used as a power semiconductor element, and a switching element and a diode are connected in parallel.

Further, the switching element of the upper arm 171 and the switching element of the lower arm 172 are connected to each other in series. Furthermore, a shunt resistor 111 serving as a current sensor is connected to a connection portion between the upper arm 171 and the lower arm 172, or in other words an alternating current terminal portion. By providing the shunt resistor 111, current feedback is realized, leading to an improvement in the ability of the current to follow a command.

Positive electrode terminals 173 of the respective power semiconductor components 121 are connected to a positive electrode terminal 501 of a battery 500. Negative electrode terminals 174 of the respective power semiconductor components 121 are connected to a negative electrode terminal 502 of the battery 500. Alternating current terminals 175 of the respective power semiconductor components 121 are connected to the stator winding 31 via second bus bars 211.

Further, a plurality of signal terminals 176 connected to the control board 124 are provided in each power semiconductor component 121. Control signals for switching the switching elements of the upper arm 171 and the lower arm 172 ON and OFF are input into the signal terminals 176.

The respective power semiconductor components 121 are formed by soldering the power semiconductor elements and the shunt resistors 111 to copper frames, connecting the frames to each other using sheet copper or aluminum wire, and sealing the resulting component with resin. Alternatively, the respective power semiconductor components 121 may be formed by soldering the power semiconductor elements and the shunt resistors 111 to a metallic substrate made of aluminum, copper, or the like and coated with an insulating material, or to a ceramic substrate.

Further, each power semiconductor component 121 includes a heat dissipating surface 177 from which heat generated by the power semiconductor elements and the shunt resistor 111 dissipates. Furthermore, each power semiconductor component 121 is mounted in the heat sink 140 such that the heat dissipating surface 177 contacts a mounting surface of the heat sink 140, i.e. a surface thereof on an opposite side to the motor main body 200.

Note, however, that when the heat dissipating surface 177 is conductive relative to the power semiconductor elements and the shunt resistor 111, the power semiconductor component 121 is mounted in the heat sink 140 via a heat transfer material having an electric insulating property so that distance is secured between the heat dissipating surface 177 and the heat sink 140. In this case, grease, gel, or adhesive possessing viscosity and fluidity or a non-fluid sheet or tape is used as the heat transfer material.

As long as the heat dissipating surface 177 is electrically insulated from the power semiconductor elements and the shunt resistor 111, a conductive heat transfer material other than the heat transfer materials mentioned above may be used, and distance need not be secured between the heat dissipating surface 177 and the heat sink 140.

A plurality of heat dissipating fins 141 are formed on a surface of the heat sink 140 on an opposite side to the mounting surface. The heat dissipating fins 141 are formed in a region opposing a mounting region in which the power semiconductor components 121 are mounted. Further, the heat dissipating fins 141 are formed in a radial shape centering on the rotary shaft 4 so as to project vertically from the surface of the heat sink 140 on the opposite side to the mounting surface. With this configuration, the heat generated by the power semiconductor elements and the shunt resistors 111 is transferred to the heat sink 140 such that an increase in the temperatures of the power semiconductor components 121 is suppressed.

Note that a field circuit unit (not shown) formed as a bridge circuit using a switching element and a diode is also mounted on the mounting surface of the heat sink 140. An upper arm side of the bridge circuit of the field circuit unit is connected to the positive electrode terminal 501 of the battery 500, and a lower arm side is connected to the negative electrode terminal 502 of the battery 500. The field winding 5 is connected in parallel to the diode.

Electronic components (not shown) such as a CPU are mounted on the control board 124, thereby forming a control circuit that controls the switching elements of the power circuit unit 120 and the field circuit unit to switch ON and OFF. The control board 124 controls the switching elements of the power circuit unit 120 and the field circuit unit to switch ON and OFF, and exchanges direct current power from the battery 500 with alternating current power from the stator winding 31 and direct current power from the field winding 5.

The power semiconductor components 121, the smoothing capacitor units 122, the control board 124, and so on are mounted on the mounting surface side of the heat sink 140. Further, the resin case 126 is mounted on the mounting surface of the heat sink 140. The resin case 126 encloses the electronic components mounted on the mounting surface of the heat sink 140.

Furthermore, an opening formed in the resin case 126 on an opposite side to the heat sink 140 is blocked by a resin cover 130. As a result, the electronic components mounted on the mounting surface of the heat sink 140 are protected from water and dust. Note that by filling the resin case 126 with a potting material (not shown) until the control board 124 is hidden, improvements can be achieved in the waterproofing and dustproofing performance and in vibration resistance.

A first bus bar 125 serving as a wiring material for transmitting direct current power is formed in an inner peripheral portion of the resin case 126 by insert molding or outsert molding. The first bus bar 125 is connected to a sixth bus bar 128. The sixth bus bar 128 is provided with a positive electrode cable terminal 190.

A positive electrode cable 503 is connected to the positive electrode cable terminal 190. The positive electrode cable terminal 190 is press-fitted into the sixth bus bar 128. The first bus bar 125 is connected to the positive electrode terminal 501 of the battery 500 via the sixth bus bar 128 and the positive electrode cable 503.

The positive electrode terminals 173 of the respective power semiconductor components 121 are connected to the first bus bar 125. The alternating current terminals 175 of the respective power semiconductor components 121 are connected to the corresponding second bus bars 211. The second bus bars 211 are connected to corresponding lead wires of the stator winding 31. Further, the second bus bars 211 are respectively covered by resin bodies 212 to improve the vibration resistance and insulating property thereof.

A negative electrode cable terminal 191 is press-fitted into the heat sink 140. A negative electrode cable 504 is connected to the negative electrode cable terminal 191. The heat sink 140 is connected to the negative electrode terminal 502 of the battery 500 via the negative electrode cable 504. As a result, the heat sink 140 is set at a negative electrode potential. Further, the heat sink 140 is insulated from a positive electrode potential and an alternating current potential by air and the resin case 126.

The negative electrode terminals 174 of the respective power semiconductor components 121 are connected to corresponding third bus bars 123. The third bus bars 123 are fastened to the heat sink 140 by screws 80.

The three power semiconductor components 121 are disposed in a ring centering on the rotary shaft 4 on an identical plane that is perpendicular to the rotary shaft 4. As a result, an axial direction dimension and a radial direction dimension of the power supply unit 300 are reduced.

The first bus bar 125 is disposed continuously on an inner peripheral side of all of the power semiconductor components 121. In this example, the first bus bar 125 is disposed on the inner peripheral side of all of the power semiconductor components 121 in an annular shape that is open in one location.

The positive electrode terminals 173 of the respective power semiconductor components 121 are disposed on the inner peripheral side of the power semiconductor components 121 in order to be connected to the first bus bar 125 disposed on the inner peripheral side of the power semiconductor components 121. The negative electrode terminals 174 the respective power semiconductor components 121 are disposed on the outer peripheral side of the power semiconductor components 121 in order to be connected to the third bus bars 123, which are disposed on an outer peripheral side of power semiconductor components 121.

The alternating current terminals 175 of the respective power semiconductor components 121 are disposed on the outer peripheral side of the power semiconductor components 121 in order to be connected to the second bus bars 211, which are disposed on the outer peripheral side of the power semiconductor components 121. By disposing one terminal on the inner peripheral side of the power semiconductor components 121 and disposing two terminals on the outer peripheral side in this manner, the three power semiconductor components 121 can be disposed in an annular shape having a tightly formed inner peripheral side, and as a result, the radial direction dimension of the power supply unit 300 can be reduced efficiently.

Positive electrode terminals 134 of the respective smoothing capacitor units 122 are connected to the first bus bar 125 via fourth bus bars 132. Negative electrode terminals 135 of the respective smoothing capacitor units 122 are connected to the third bus bars 123 via fifth bus bars 133.

As a result, the smoothing capacitor units 122 are inserted between the positive electrode terminals 173 and the negative electrode terminals 174 of the power semiconductor components 121 and between the positive electrode terminal 501 and the negative electrode terminal 502 of the battery 500 so as to absorb a current ripple and thereby suppress voltage variation.

Further, the smoothing capacitor units 122 are preferably disposed at low inductance between the power semiconductor components 121 in which voltage variation occurs, and are therefore disposed in an annular shape, similarly to the power semiconductor components 121 disposed in an annular shape. Moreover, the three power semiconductor components 121 and the three smoothing capacitor units 122 are disposed alternately on a plane perpendicular to the rotary shaft 4, or in other words when seen in the axial direction of the rotary shaft 4, and disposed in an annular shape centering on the rotary shaft 4.

Furthermore, each power semiconductor component 121 includes a first side face positioned on the inner peripheral side and a second side face positioned on the outer peripheral side so as to oppose the first side face, the positive electrode terminal 173 being provided on the first side face and the negative electrode terminal 174 being provided on the second side face. The positive electrode terminal 134 of the smoothing capacitor unit 122 is provided on the same side as the positive electrode terminal 173 of the power semiconductor component 121, i.e. the inner peripheral side, and the negative electrode terminal 135 of the smoothing capacitor unit 122 is provided on the same side as the negative electrode terminal 174 of the power semiconductor component 121, i.e. the outer peripheral side.

Hence, the positive electrode terminal 173 and the negative electrode terminal 174 of the power semiconductor component 121 are disposed on the inner peripheral side and the outer peripheral side, respectively, while the positive electrode terminal 134 and the negative electrode terminal 135 of the smoothing capacitor unit 122 are likewise disposed on the inner peripheral side and the outer peripheral side, respectively.

By disposing the positive electrode terminal 134 and the negative electrode terminal 135 on the respective sides of the smoothing capacitor unit 122, similarly to the power semiconductor component 121, the power semiconductor components 121 and the smoothing capacitor units 122 can be arranged in an annular shape, and the wires thereof can be shortened, enabling a reduction in inductance.

Further, by disposing the power semiconductor components 121 and the smoothing capacitor units 122 in an annular shape and disposing the first bus bar 125 on the inner peripheral side, the positive electrode terminals 173 of the power semiconductor components 121 can be brought closer to the positive electrode terminals 134 of the smoothing capacitor units 122, enabling a reduction in inductance.

Furthermore, in this example, the power semiconductor component 121 and the smoothing capacitor unit 122 form a pair such that the negative electrode terminal 174 of the power semiconductor component 121 is disposed on the side of the corresponding smoothing capacitor unit 122. Therefore, the negative electrode terminal 174 of the power semiconductor component 121 can be brought closer to the negative electrode terminal 135 of the smoothing capacitor unit 122, making it easier to shorten the third bus bars 123, and as a result, the inductance can be reduced.

The smoothing capacitor units 122 are preferably used at a ratio of 1:1 relative to the power semiconductor components 121, but a single smoothing capacitor unit 122 may be used for every two power semiconductor components 121. Likewise in this case, by disposing the power semiconductor components 121 and the smoothing capacitor units 122 alternately in an annular shape, the respective wiring distances between the power semiconductor components 121 and the smoothing capacitor units 122 can be made equal more easily, thereby equalizing the respective inductance values such that ripple variation can be suppressed.

Furthermore, in this example, a plurality of capacitor elements 122a are included in each smoothing capacitor unit 122. In each smoothing capacitor unit 122, the capacitor elements 122a are disposed so as to be arranged in a radial shape centering on the rotary shaft 4. In each capacitor element 122a, a positive electrode terminal is disposed on an inner peripheral side and a negative electrode terminal is disposed on an outer peripheral side.

In a case such as that described above, in which the capacitance of the smoothing capacitor unit 122 is increased by increasing the number of capacitor elements 122a provided therein, the positive and negative electrode terminals 173, 174 of the respective power semiconductor components 121 can be brought closer to the positive and negative electrode terminals 134, 135 of the respective smoothing capacitor units 122 by setting the size of each capacitor element 122a in the radial direction of the power supply unit 300 to be no greater than half the size of the power semiconductor component 121 in the same direction and disposing the capacitor elements 122a in a radial shape. In so doing, the fourth bus bars 132 and fifth bus bars 133 can also be shortened, enabling a reduction in the inductance. Moreover, an increase in size in the radial direction can be suppressed, and therefore the rotary electric machine can be configured in a small size.

Note that the smoothing capacitor unit 122 may be constituted by a printed board, a metal substrate, or a ceramic substrate formed with a circuit pattern.

Further, a plurality of capacitor housing portions 142 are provided in the heat sink 140 as recessed portions projecting toward the opposite side to the mounting surface, or in other words toward the motor main body 200 side. By controlling the power semiconductor components 121 to switch ON and OFF, current control can be performed with a high degree of precision, enabling improvements in output precision and efficiency, but at the same time, voltage variation occurs such that a current ripple is generated. The smoothing capacitor units 122 that absorb this variation generate heat when the current ripple is applied thereto, leading to an increase in the temperatures thereof. This increase in the temperatures of the smoothing capacitor units 122 shortens the lives of smoothing capacitor units 122, and therefore the smoothing capacitor units 122 are housed respectively in the capacitor housing portions 142.

The fourth bus bars 132 and the fifth bus bars 133 are respectively covered by resin 127 to improve the vibration resistance and insulating property thereof. The resin 127 contacts the heat sink 140, thereby positioning the respective smoothing capacitor units 122 in the axial direction.

Further, the smoothing capacitor units 122 are positioned in the radial direction by providing countersinks in the heat sink 140 in accordance with an outer shape of the resin 127, or by providing projections in at least two locations on the heat sink 140 side of the resin 127 and inserting the projections into holes formed in the heat sink 140.

By mounting the smoothing capacitor units 122 on the surface of the heat sink 140 on which the heat dissipating fins 141 are disposed in this manner, the smoothing capacitor units 122 can be mounted without increasing an axial length of the rotary electric machine.

The positive electrode cable 503 is connected to the positive electrode cable terminal 190 using screws, bolts, or the like. The negative electrode cable 504 is connected to the negative electrode cable terminal 191 using screws, bolts, or the like. The negative electrode terminal 502 of the battery 500 is connected to a vehicle body 700.

Attachment portions (not shown) are provided on the front bracket 1 and the rear bracket 2. The attachment portions are fixed securely to a body of the vehicle body 700 or an engine by bolts. The rear bracket 2 and the vehicle body 700 are electrically connected via the stator core 32 and the front bracket 1. Note that when the heat sink 140 can be electrically connected to the negative electrode terminal 502 of the battery 500 via the vehicle body 700, the negative electrode cable 504 may be omitted.

Next, a flow of current and a flow of cooling air through the rotary electric machine according to the first embodiment will be described. The current flow differs depending on whether the rotary electric machine is operated as a motor or as a power generator, but here, a case in which the rotary electric machine is operated as a motor will be described.

The current flows into the power supply unit 300 from the positive electrode terminal 501 of the battery 500 through the positive electrode cable 503 and the positive electrode cable terminal 190, flows into the stator winding 31 via the upper arm 171 and the shunt resistor 111 of the power semiconductor component 121 of a certain phase, then flows into the heat sink 140 via the shunt resistor 111 and the lower arm 172 of a power semiconductor component of another phase, and then returns to the negative electrode terminal 502 of the battery 500 through the negative electrode cable terminal 191 and the negative electrode cable 504.

In the control board 124, a pattern for controlling the ON/OFF conditions of the power semiconductor elements is calculated from information such as the temperatures of the shunt resistor 111, the rotation sensor, and the power semiconductor elements.

Hence, direct current power from the battery 500 is converted into alternating current power by the power supply unit 300, and the alternating current power is supplied to the stator winding 31. As a result, a rotary magnetic field is generated in the stator core 32, causing the rotor 6 to rotate and causing the cooling fans 73, 74 to rotate. Accordingly, cooling air W1 taken in through the front side intake port 11 flows through the air duct R1 on the front side and is discharged to the outside through the front side discharge port 12. A coil end of the stator winding 31 is cooled by the cooling air W1 flowing through the air duct R1.

On the rear side, meanwhile, cooling air W2 flows inward in the radial direction from the outside through the air duct R2 between the rear bracket 2 and the heat sink 140, flows into the motor main body 200 through the rear side intake port 21, flows through the air duct R3, and is discharged to the outside through the rear side discharge port 22.

At this time, the heat dissipating fins 141 project into the air duct R2, and are therefore exposed to the cooling air W2 flowing through the air duct R2. Accordingly, the heat generated by the power semiconductor components 121 is dissipated into the cooling air W2 via the heat dissipating fins 141, and as a result, increases in the temperatures of the power semiconductor components 121 are suppressed.

Further, the capacitor housing portions 142 project into the air duct R2, and are therefore exposed to the cooling air W2 flowing through the air duct R2. Accordingly, the heat generated by the smoothing capacitor units 122 is dissipated into the cooling air W2 via the capacitor housing portions 142, and as a result, increases in the temperatures of the smoothing capacitor units 122 are suppressed.

Furthermore, the heat generated by the smoothing capacitor units 122 is transferred to the heat sink 140 through the fifth bus bars 133 and the third bus bars 123, and as a result, the smoothing capacitor units 122 are cooled.

Moreover, the capacitor housing portions 142 are filled with a heat transfer material 160 such that the heat transfer material 160 is interposed between the smoothing capacitor units 122 and the heat sink 140. Low-viscosity grease or gel, an adhesive, a sheet, tape, or the aforementioned potting material may be used as the heat transfer material 160.

By interposing the heat transfer material 160 between the smoothing capacitor units 122 and the heat sink 140, heat resistance from the smoothing capacitor units 122 to the heat sink 140 can be reduced, and as a result, the temperatures of the smoothing capacitor units 122 can be reduced even further. In addition, the respective smoothing capacitor units 122 can be thermally connected such that temperature differences therebetween are reduced. As a result, a situation in which an excessive current flows to a specific smoothing capacitor unit 122 having low electric resistance due to variation in the electric resistance caused by a temperature difference, thereby shortening the life of the smoothing capacitor unit 122, can be prevented from occurring.

Note that when the heat transfer material 160 is disposed over the entire outer periphery of the smoothing capacitor unit 122, a superior heat transfer effect is obtained, but since the thermal conductivity of the heat transfer material 160 is at least one order of magnitude higher than the thermal conductivity of air, a temperature reduction effect is obtained even when the heat transfer material 160 is disposed on a part of the outer periphery.

Further, when the smoothing capacitor unit 122 includes an explosion proof valve, a recessed portion 146 is provided in an explosion proof valve part of the capacitor housing portion 142, a bottom surface of the smoothing capacitor unit 122 is aligned with a bottom surface of the capacitor housing portion 142, and the heat transfer material 160 is not provided in the recessed portion 146.

Next, the flow of the cooling air W2 relative to the heat sink 140 will be described in detail using FIG. 4. FIG. 4 is a sectional view showing the heat sink 140 from the rear bracket 2 side. The cooling air W2 is divided into cooling air W20, cooling air W21, cooling air W22, and so on.

The cooling air W20 flows along an air path R20 formed by spaces between the heat dissipating fins 141 and the rear bracket 2 side surface of the heat sink 140. The cooling air W21 flows along an air path R21 formed by the capacitor housing portions 142 and the rear bracket 2. The cooling air W22 flows along an air path R22 formed by spaces between the heat dissipating fins 141 and side walls of the capacitor housing portions 142, and the rear bracket 2 side surface of the heat sink 140.

By disposing the power semiconductor components 121 and the smoothing capacitor units 122 in a radial shape relative to the cooling air W2 that is caused to flow toward an axial center by the rear side cooling fan 74, the heat dissipating fins 141 and the capacitor housing portions 142 can be disposed in a radial shape in alignment with the flow of the cooling air W2. Accordingly, an increase in pressure loss in the air duct R2 can be suppressed, and therefore the heat dissipating fins 141 and the capacitor housing portions 142 can be disposed on the heat sink 140 without impairing a flow rate of the cooling air. As a result, an improvement in the cooling capacity can be achieved.

Hence, the heat generated by the smoothing capacitor units 122 is transferred to the heat sink 140 via the fifth bus bars 133 and the third bus bars 123 and transferred to the capacitor housing portions 142 through the air and the heat transfer material 160, whereby the temperatures of the smoothing capacitor units 122 can be reduced by the cooling air flowing through the capacitor housing portions 142. As a result, the lifespan of the smoothing capacitor units 122 can be increased.

Further, an increase in pressure loss is suppressed, and therefore an increase in the temperatures of the power semiconductor components 121 can also be reduced, enabling an improvement in performance. Moreover, the coil end of the stator winding 31 is cooled by the cooling air W2 flowing through the air duct R3.

Note that here, an example in which the heat sink 140 is cooled by air was described, but the cooling performance can be improved even further by passing cooling water through the air ducts in a similar manner to that described above. In this case, by providing a flow passage cover on the rear bracket 2 side of the heat sink 140, the cooling water is divided into a flow that passes through a flow passage formed by the spaces between the heat dissipating fins 141 and the rear bracket side surface of the heat sink 140, a flow that passes through a flow passage formed by the spaces between the heat dissipating fins 141 and the side walls of the capacitor housing portions 142 and the rear bracket 2 side surface of the heat sink 140, a flow that passes through a flow passage formed by the capacitor housing portions 142 and the flow passage cover, and so on.

Further, the bus bars are preferably connected by soldering or welding in order to save space, but may be fixed by screws.

Furthermore, in the first embodiment, an example in which the three power semiconductor components 121 are used in a three-phase motor in which one power semiconductor component 121 is provided for each phase was described, but similar effects can be obtained by disposing n−1 smoothing capacitor units 122 in relation to n power semiconductor components 121. By disposing the smoothing capacitor units 122 alternately with the power semiconductor components 121 having power semiconductor elements for a plurality of phases, similar effects are obtained.

Moreover, the rotary electric machine according to this embodiment can also be used as a power generator.

What is claimed is:

1. A rotary electric machine comprising:
a motor main body having a rotary shaft; and
a power supply unit that supplies power to the motor main body and includes a metal casing, a power circuit unit mounted in the metal casing, and a control board for controlling an operation of the power circuit unit, wherein the power circuit unit includes a plurality of power semiconductor components and a capacitor unit that are disposed alternately on a plane perpendicular to the rotary shaft, the plurality of power semiconductor components and the capacitor unit are disposed in an annular shape centering on the rotary shaft, the capacitor unit includes a plurality of capacitor elements disposed in a radial shape centering on the rotary shaft, the plurality of capacitor elements are arranged on a straight line along a radial direction, the metal casing is a heat sink that is cooled by a fluid, the plurality of power semiconductor components are mounted on a mounting surface of the heat sink on an opposite side to the motor main body, a capacitor housing portion is provided in the heat sink as a recessed portion projecting to an opposite side to the mounting surface, and the capacitor unit is housed in the capacitor housing portion.

2. The rotary electric machine according to claim 1, wherein each of the plurality of power semiconductor components includes:

a first side face and a second side face opposing the first side face, a positive electrode terminal is provided on the first side face, and a negative electrode terminal is provided on the second side face, wherein a positive electrode terminal of the capacitor unit is provided on an identical side with respect to the rotary shaft as the positive electrode terminal of the plurality of power semiconductor components, respectively, and a negative electrode terminal of the capacitor unit is provided on an identical side with respect to the rotary shaft as the negative electrode terminal of the plurality of power semiconductor components, respectively.

3. The rotary electric machine according to claim 1, wherein a plurality of heat dissipating fins are formed on a surface of the heat sink on an opposite side to the mounting surface, and a flow passage through which the fluid flows is formed by spaces between the plurality of heat dissipating fins and side walls of the capacitor housing portion, and the surface of the heat sink on the opposite side to the mounting surface.

4. The rotary electric machine according to claim 2, wherein the negative electrode terminal of the capacitor unit is connected to the heat sink.

* * * * *